2,801,256
PREPARATION OF ALIPHATIC ESTERS

Norman O. V. Sonntag, Long Island City, N. Y., assignor to Colgate-Palmolive Company, Jersey City, N. J., a corporation of Delaware No Drawing. Application November 22, 1954,
Serial No. 470,536

5 Claims. (Cl. 260—410.9)

The present invention relates to a process for preparing aliphatic esters in high yield and purity.

A common method of preparing aliphatic esters involves reacting an aliphatic acid or ester thereof with the suitable alcohol, preferably in the presence of a mineral acid or acid-acting substance as a catalyst, such as zinc chloride, aluminum chloride, aluminum sulfate, sulfuric acid, and the like. It has been proposed also that acid chlorides may be reacted with alcohols to form the corresponding ester but such process is in general not conducive to the obtention of the product in high yield and purity.

It has now been found that aliphatic esters may be prepared by the reaction of an aliphatic acid halide with an aluminum alcoholate in an essentially anhydrous medium, preferably in the presence of an inert solvent, whereby the ester is obtained in high yield and purity.

The aliphatic acid halides may be derived from fatty acids and the like in known manner. These fatty acid halides generally have about 8–24, and preferably about 10–18 carbon atoms. It is preferred to use the acid chlorides though the other acid halides such as the acid bromides may be suitably employed also. Examples of suitable acid halides are the acid chlorides and acid bromides of caprylic, caproic, lauric, myristic, palmitic, stearic, oleic, linoleic acids and the like. These substances may be used alone or in any desired mixture thereof such as the higher fatty acid mixtures derived from coconut, palm, palm kernel, tallow, cotton seed, various fractions thereof, and their hydrogenated derivatives and so forth.

The aluminum alcoholate which is used as a reactant may be derived from any suitable alcohol. It is preferred to use the aluminum alcoholates of lower aliphatic monohydric alcohols such as those having up to about 6 carbon atoms, and preferably about 1–4 carbons. The alcohols may be saturated or unsaturated; and primary, secondary, or tertiary alcohols may be employed herein. Suitable examples are aluminum propoxide, aluminum ethoxide, aluminum butoxide, aluminum isopropoxide, aluminum isobutoxide, aluminum tertiary butoxide, and the like.

There may be used similarly the aluminum salt of lower polyhydric alcohols, such as ethylene glycol, propylene glycol and glycerol. It is most desirable that the aluminum alcoholate be in a dry and finely-powdered state though it may be employed in any suitable form.

The acid halide and aluminum alcoholate may be employed in any suitable proportions in order to form the desired ester. In general, the reaction may be conducted by employing substantially stoichiometric ratios of the two reactants. If desired, it is possible to use an excess of either reactant. It is preferred to use stoichiometric amounts in order that there may be a minimum of unreacted material in the final reaction product.

The reaction is conducted in an essentially anhydrous medium since the presence of substantial, or even minor but significant amounts of water would hydrolyze the alcoholate to the free alcohol and aluminum hydroxide and thereby prevent the reaction from going to completion. While the reaction may be conducted by mixing the two reactants, such a mixture produces a heterogeneous system which is viscous and not as adaptable to commercial production as with the use of a solvent. It is preferred therefore, to suspend the reactants in an inert organic solvent as a reaction medium in order to facilitate the reaction. The amount of solvent is not critical and is to be sufficient to form a fluid reaction medium which may be agitated during the reaction if desired. Any inert organic solvent may be used as desired, such as liquid hydrocarbons, e. g. toluene, benzene, and hexane; ether, halogenated hydrocarbons, e. g. ethylene dichloride, and the like.

The reaction may be conducted at room temperature and no external heat need be applied therefore. If desired, however, any suitable elevated temperatures such as up to about the refluxing temperature of the mixture may be employed satisfactorily though excessive elevated temperatures tend to increase the yield of undesirable by-products. It is preferred that the reaction be conducted at temperatures up to about 125° C. however. The final desired reaction product is an oil usually, and may be separated in any suitable manner from the reaction mixture containing the aluminum halide formed as a by-product. Any suitable means for solid-liquid phase separation including filtration, centrifugal force, distillation and the like may be employed. The ester may be subjected to any further conventional means of purification if desired, such as washing, drying, distilling, solvent extracting or crystallizing the product. For example, it may be washed with water to decompose any unreacted alcoholate, further treated with dilute acid to remove traces of any aluminum hydroxide formed in the washing, and then with mild alkali if desired. The solvent used as the reaction medium may be separated in any desirable manner, such as by distillation.

The desired ester is recovered from the reaction mixture in high yield and purity. The formation of this ester in such a manner is considered unusual since it was conceivable that the reactants would produce alcohol by Meerwein-Ponndorf reduction instead of the ester. This reaction is superior to that involving the use of alkali metal alcoholates since the latter tend to produce ester-cleaving alkali hydroxides upon hydrolysis whereas the corresponding aluminum-containing by-products are inert in this respect.

The following examples are further illustrative of the nature of the present invention and are not intended to limit the scope thereto in any manner. All amounts are by weight unless otherwise specified.

Example 1

Fifty milliliters (46.85 gm., 214 millimoles) of lauroyl chloride and 14.58 gm. (71 millimoles) of anhydrous aluminum isopropoxide are mixed in 200 ml. dry toluene and heated at a temperature sufficient to distill the solvent off over a period of 1.5 hours. An additional 200 ml. of dry toluene are added to the reaction mixture and distillation of the solvent is resumed for another 1.5 hours. The resulting product is cooled and the oily residue is washed successively with 400 ml. of 10% sulfuric acid, 400 ml. dilute ammonium hydroxide, 400 ml. 10% sulfuric acid and finally twice with 500 ml. portions of water. Distillation of the wet oily residue then yields a fraction of 36.80 gm. (151.8 millimoles, 72%) of isopropyl laurate, B. P. 105–106° C. at 0.8 mm. Saponification equivalent—calculated 242.39; found: 243.

Example II

The procedure of Example I is repeated with the modification that aluminum isobutoxide is used in the presence of 200 ml. of dry ether. The corresponding isobutyl laurate is recovered similarly in high yield and purity.

Example III

The procedure of Example I is repeated using coconut fatty acid chloride with an equivalent amount of anhydrous aluminum ethoxide as the reactants, resulting in the recovery of the ethyl esters of the coconut fatty acid in high yield and purity also.

Although the present invention has been described with reference to particular embodiments and example, it will be apparent to those skilled in the art that variations and modifications can be substituted therefore without departing from the principles and true spirit of the invention.

Having thus described the invention, what is claimed is:

1. A process which comprises reacting an aliphatic acid halide with an aluminum alcoholate in an essentially anhydrous medium.

2. A process which comprises reacting a higher aliphatic acid halide with an aluminum salt of a lower aliphatic alcohol in the presence of an essentially anhydrous inert organic solvent and recovering the aliphatic ester formed thereby.

3. A process for the preparation of aliphatic esters which comprises reacting a higher fatty acid halide with an aluminum alcoholate of a lower aliphatic saturated monohydric alcohol in an essentially anhydrous medium, and recovering the aliphatic ester formed thereby.

4. A process in accordance with claim 3 wherein the reaction is conducted in the presence of an inert organic solvent.

5. A process in accordance with claim 3 wherein the reaction is conducted at a temperature up to about 125° C.

References Cited in the file of this patent

UNITED STATES PATENTS 1,691,425    Ayres et al. _____ Nov. 13, 1928

OTHER REFERENCES

Groggins: Unit Processes in Organic Synthesis, 3rd ed. (1947), McGraw-Hill Book Co., New York City, page 615.